W. S. CHAPMAN.
Thill-Coupling.

No. 11,471.

Patented Aug. 8, 1854.

UNITED STATES PATENT OFFICE.

WM. S. CHAPMAN, OF CINCINNATI, OHIO.

PREVENTING RATTLING IN CARRIAGES.

Specification forming part of Letters Patent No. 11,471, dated August 8, 1854; Reissued September 18, 1866, No. 2,358.

*To all whom it may concern:*

Be it known that I, WM. S. CHAPMAN, of Cincinnati, Ohio, have invented a new and useful improvement in preventing the rattling noise proceeding from that part of carriages where the shafts are attached to the front axle and in rendering such parts less liable to wear and derangement and thereby adding safety to riding-vehicles.

The shafts of carriages are usually attached to the front axle by means of bolts passing through eyes in the ends of the shafts and secured by nuts in a forked piece of metal usually termed the "clip." From the irregular and constantly varying motions of the horse and carriage this part is very liable to wear and the nut from continual jarring and turning of the bolt to become loose and slip off. This is generally the first part to wear out from its constant motion and exposure to dust and grit, and the jerking of the horse, and the noise from the rattling of the bolt or the shaft is very annoying, and these difficulties I obviate by the insertion of blocks of india rubber of a peculiar form between the end of the shaft and the clip. The blocks may be used to stop the rattling of old carriages and should always be used with new carriages as a preventive against wear and consequent accidents in new carriages. Experience has fully demonstrated that oiling or greasing the bolt of the clip increases, instead of diminishing the wear of these parts in consequence of the adhesion of dust and grit to the oiled surfaces. The india rubber blocks therefore to a certain extent supply the place of lubricating materials and add greatly to the comfort of riding. In cases where the shaft is loose in the clip a sudden start of the horse brings his momentum against the inertia of the carriage and aften tears out the clips or breaks the bolts.

Figure 3:
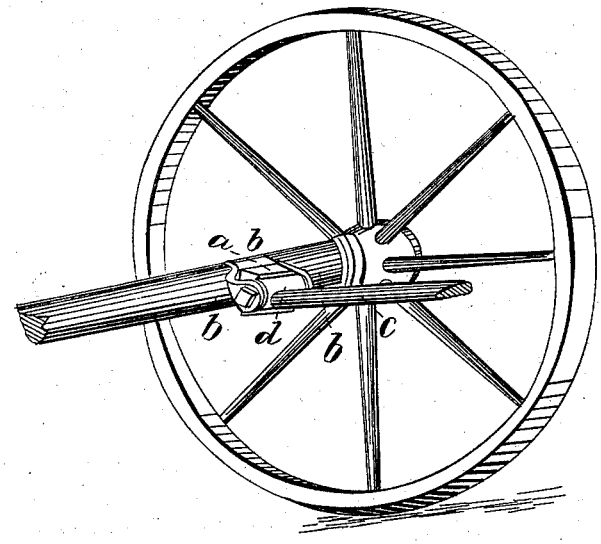
Figure 2:
Figure 1:
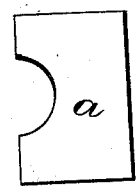
Figure 4:
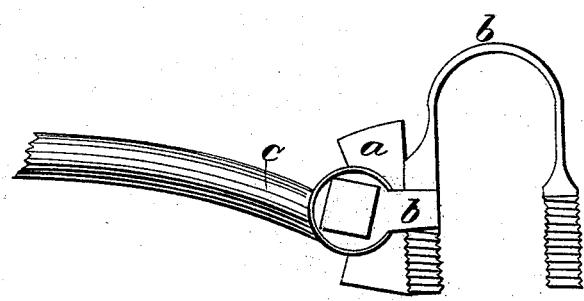

Figure 1 exhibits a vertical section of the india rubber block; Fig. 2, a front view of the same; Fig. 3, a perspective view of the block, clip and shaft where $a$ is the block, $b$ is the clip and $c$ the shaft attached to the clip in the usual manner. The block is here represented in place, which it will retain by virtue of its form embracing above and below the eye $d$ on the end of the shaft. The block of vulcanized rubber is strained into its place so as to be under tension. Fig. 4 is a side view of block, clip and shaft.

What I claim as my invention and desire to secure by Letters Patent, is—

The employment of blocks of india rubber, or equivalent elastic material, of the form substantially as herein set forth, between the ends of carriage shafts and the clips upon the axles, for the purposes of preventing wear, rattling noise and accident as herein above set forth.

WM. S. CHAPMAN.

Witnesses:
WM. SMITH,
SAM G. HARRIS.

[FIRST PRINTED 1913.]